(12) United States Patent
Zhao et al.

(10) Patent No.: US 11,381,766 B2
(45) Date of Patent: Jul. 5, 2022

(54) BRACKET REDUCING FLARE AND HAVING NO DARK EDGES, LENS MODULE, AND ELECTRONIC DEVICE

(71) Applicant: TRIPLE WIN TECHNOLOGY(SHENZHEN) CO.LTD., Shenzhen (CN)

(72) Inventors: Zhi-Fei Zhao, Jincheng (CN); Wen-Ching Lai, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 296 days.

(21) Appl. No.: 16/740,951

(22) Filed: Jan. 13, 2020

(65) Prior Publication Data
US 2021/0127078 A1    Apr. 29, 2021

(30) Foreign Application Priority Data
Oct. 29, 2019   (CN) .......................... 201911040450.2

(51) Int. Cl.
*H04N 5/357*   (2011.01)
*H04N 5/225*   (2006.01)
*G02B 7/02*   (2021.01)

(52) U.S. Cl.
CPC ......... *H04N 5/3572* (2013.01); *H04N 5/2254* (2013.01); *G02B 7/022* (2013.01)

(58) Field of Classification Search
CPC .. H04N 5/3572; H04N 5/2254; H04N 5/2257; H04N 5/2251; H04N 5/2253; H04N 5/374–37457; H04N 5/335–378; G02B 7/022; G02B 27/0018; G02B 7/08; H02K 41/0356; H01L 27/14643–14663; H01L 27/146–27/14893
See application file for complete search history.

(56) References Cited

U.S. PATENT DOCUMENTS

| | | | | |
|---|---|---|---|---|
| 2005/0242274 A1* | 11/2005 | Webster | ............... | H04N 5/2253 250/239 |
| 2010/0309354 A1* | 12/2010 | Tsuduki | ............ | H01L 27/14625 348/294 |
| 2012/0212637 A1* | 8/2012 | Tsuduki | ............ | H01L 27/14683 348/222.1 |
| 2015/0116954 A1* | 4/2015 | Jan | ......................... | H05K 1/181 361/740 |
| 2020/0057229 A1* | 2/2020 | Chang | .................... | G06F 1/1626 |

* cited by examiner

*Primary Examiner* — Abdelaaziz Tissire
(74) *Attorney, Agent, or Firm* — ScienBiziP, P.C.

(57) ABSTRACT

A lens module reducing flare and having no dark edges includes a bracket and a sensor. The bracket includes a supporting portion, a first receiving groove, and a second receiving groove. The supporting portion is formed at a junction between the first receiving groove and the second receiving groove. The supporting portion comprises an arc surface. The sensor is received in the first receiving groove. The sensor includes a photosensitive area and a non-photosensitive area surrounding the photosensitive area. The arc surface faces the sensor. A center of a circle of the arc surface falls within the non-photosensitive area. Light reflected by the arc surface falls outside the sensor.

16 Claims, 4 Drawing Sheets

BRACKET REDUCING FLARE AND HAVING NO DARK EDGES, LENS MODULE, AND ELECTRONIC DEVICE

FIELD

The subject matter of the application generally relates to a lens module.

BACKGROUND

Electronic devices, such as mobile phones, tablet computers, or cameras, may have lens modules. A lens module may include a lens, an image-focus motor, a filter, a sensor, a bracket, and a circuit board.

The sensor in the lens module may include a photosensitive area and a non-photosensitive area. The bracket may include a supporting portion. The filter is formed on the supporting portion. The supporting portion may include an inclined surface inclined toward the circuit board and facing the photosensitive chip. Light enters the photosensitive area to form an image. Light may also enter the non-photosensitive area and is reflected by the non-photosensitive area to the inclined surface. The inclined surface further reflects the light to the photosensitive area to form at least one flare. The flare affects the quality of the lens module.

The flare can be eliminated by blackening or matting the non-photosensitive area of the sensor or the inclined surface of the supporting portion, or reducing the size of a through hole of the supporting portion. However, blackening or matting the non-photosensitive area of the lens increases a risk of dark edges of the image. The width of the non-photosensitive area is narrow, which increases the difficulty for blackening or matting the non-photosensitive area. Furthermore, incomplete matting may occur while blackening or matting the inclined surface of the supporting portion of the bracket, which obstructs an effect on flare elimination. Moreover, when the size of the through hole is reduced, the flare is weakened, but a risk of dark edges may occur.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
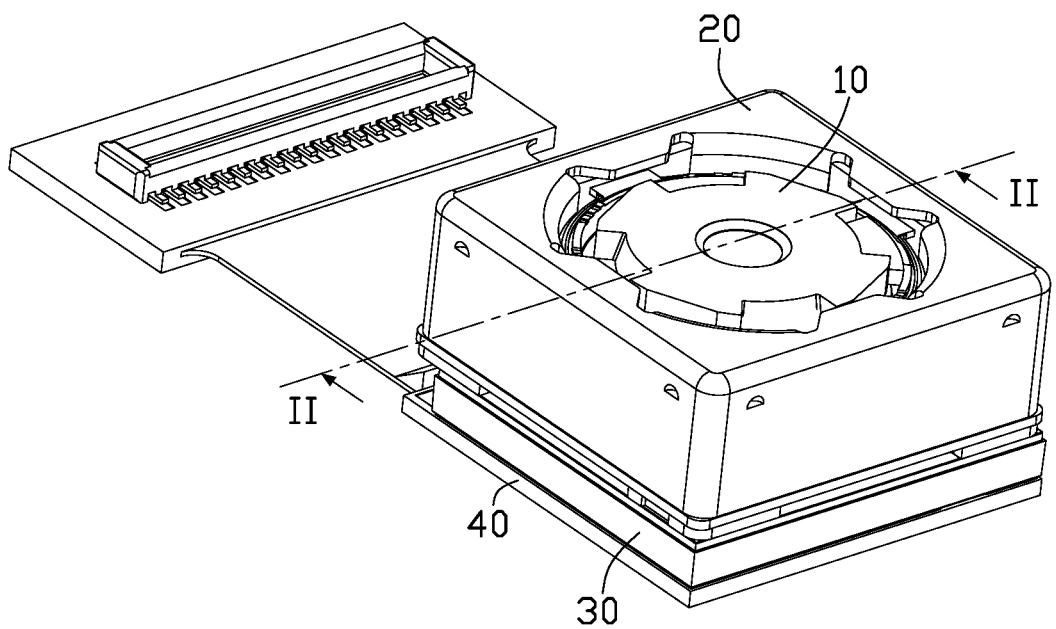
FIG. 1 is a perspective view of a lens module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
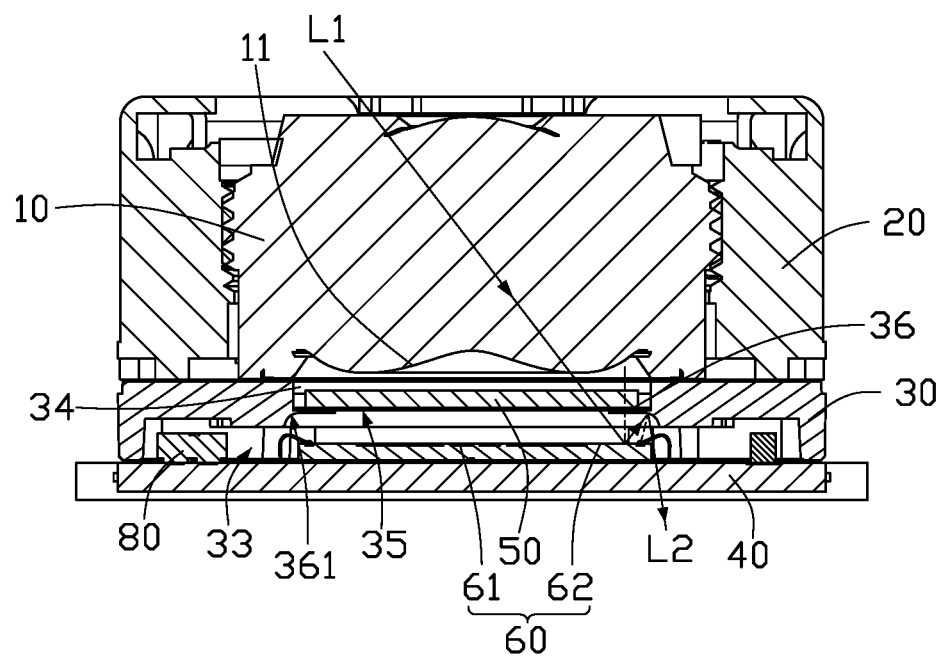
FIG. 2 is a cross-section view along line II-II of FIG. 1.
Figure 3:
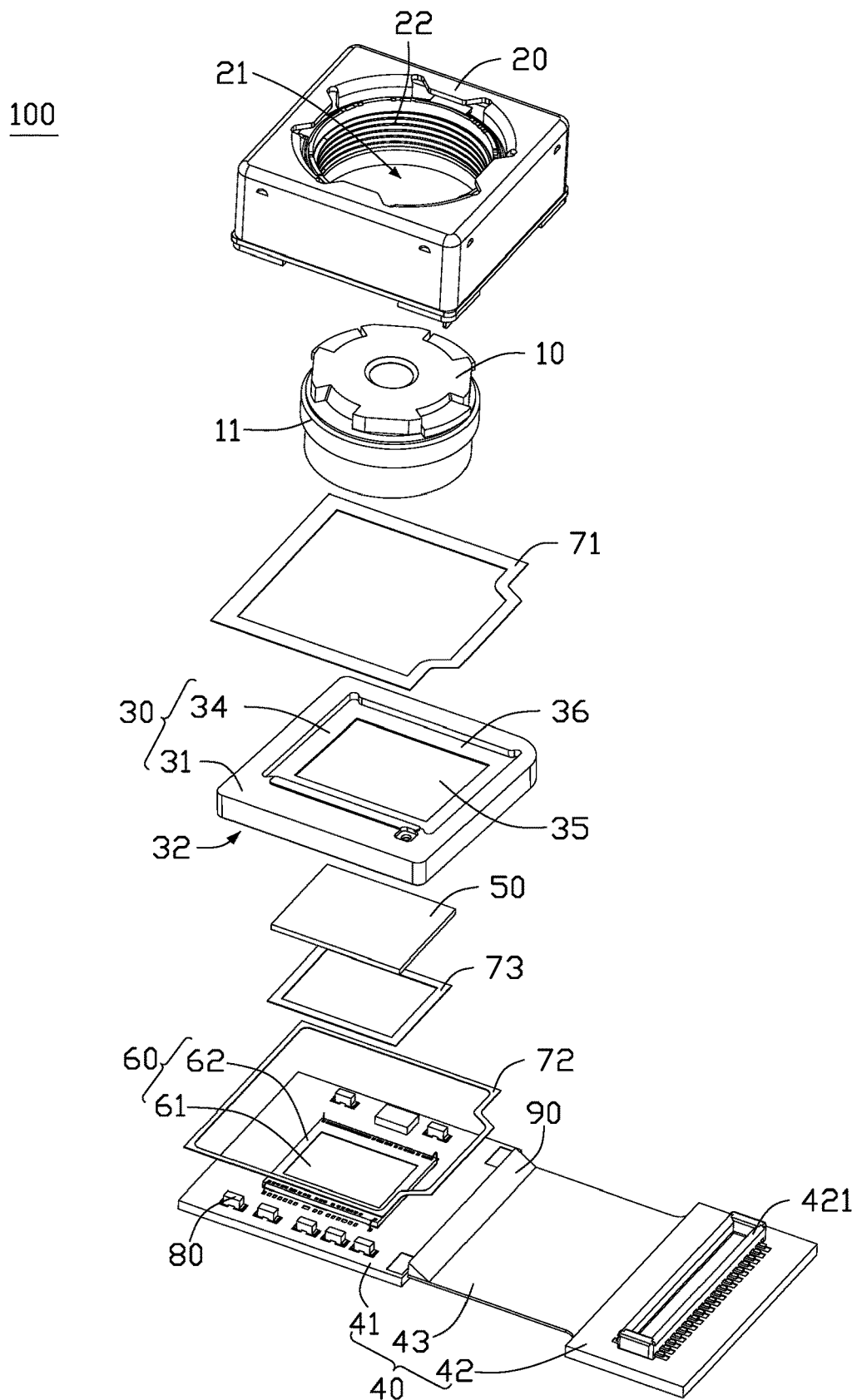
FIG. 3 is an exploded view of the lens module of FIG. 1.

FIGS. 1-3 show an embodiment of a lens module 100. In at least one embodiment, the lens module 100 is an autofocus lens module. In other embodiments, the lens module 100 may also be a certain focus lens module.

In at least one embodiment, the lens module 100 includes a lens 10, a voice coil motor 20, a bracket 30, a printed circuit board 40, an optical filter 50, and a sensor 60.

The lens 10 is received in the voice coil motor 20. The voice coil motor 20 is mounted on the bracket 30. The bracket 30 is fixed on the printed circuit board 40. The optical filter 50 is received and fixed in the bracket 30. The sensor 60 is received in the bracket 30 and electrically connected to the printed circuit board 40.

A plurality of external threads 11 is defined on an external wall of the lens 10.

The voice coil motor 20 is fixed on the bracket 30 and electrically connected to the printed circuit board 40. In at least one embodiment, the voice coil motor 20 is fixed on the bracket 30 by a first adhesive layer 71. In at least one embodiment, the first adhesive layer 71 is a thermally conductive adhesive with good heat dissipation performance.

A lens receiving groove 21 is defined in the voice coil motor 20. The lens 10 is received in the lens receiving groove 21. A plurality of internal threads 22 is defined on an internal wall of the lens receiving groove 21. The plurality of internal threads 22 matches with the plurality of external threads 11 to fix the lens 10 in the lens receiving groove 21. The voice coil motor 20 drives the lens 10 to move up and down in the lens receiving groove 21 to achieve focusing, thereby making an image clearer.

The bracket 30 supports the voice coil motor 20 and the optical filter 50. The bracket 30 is mounted on the printed circuit board 40. In at least one embodiment, the bracket 30 is fixed on the printed circuit board 40 by a second adhesive layer 72. In at least one embodiment, the second adhesive layer 72 is a thermally conductive adhesive with good heat dissipation performance.

The bracket 30 has a substantially square shape. The bracket 30 includes a first surface 31 and a second surface 32 opposite to the first surface 31. The voice coil motor 20 is formed on the first surface 31. The second surface 32 touches the printed circuit board 40. A first receiving groove 33 is defined in the bracket 30 from the second surface 32 to the supporting portion 36. A second receiving groove 34 is defined in the bracket 30 from the first surface 31 to the supporting portion 36. A supporting portion 36 is formed at a junction between the first receiving groove 33 and the second receiving groove 34. A through hole 35 is defined in the middle of the supporting portion 36. The first receiving groove 33 is connected to the second receiving groove 34 by the through hole 35. The through hole 35 faces the lens 10. The second receiving groove 34 is used to receive the optical filter 50. The first receiving groove 33 is used to receive the sensor 60. The supporting portion 36 is used to support the optical filter 50.

The supporting portion 36 includes an arc surface 361. The arc surface 361 faces the sensor 60. A center of a circle of the arc surface 361 falls within a non-photosensitive area 62 (show in FIG. 2) of the sensor 60. A light L1 entering the non-photosensitive area 62 is reflected to the arc surface 361 and then reflected by the arc surface 361 to form a reflecting light L2. The reflecting light L2 falls outside the sensor 60.

The printed circuit board 40 may be a ceramic substrate, a flexible printed circuit board, a rigid printed circuit board, a rigid-flex printed circuit board, or the like. In at least one embodiment, the printed circuit board 40 is a rigid-flex printed circuit board.

The printed circuit board 40 includes a first rigid portion 41, a second rigid portion 42, and a flexible portion 43 located between the first rigid portion 41 and the second rigid portion 42.

A plurality of electronic components 80 is mounted on the printed circuit board 40 and electrically connected to the printed circuit board 40. The plurality of electronic components 80 is located around the sensor 60. In at least one embodiment, the plurality of electronic components 80 is mounted on the first rigid portion 41. The plurality of electronic components 80 can be components such as a resistor, a capacitor, a diode, a transistor, a relay, or an electrically erasable programmable read only memory (EEPROM).

An electrical connection portion 421 is mounted on the printed circuit board 40. The electrical connection portion 421 is used to implement signal transmission between the lens module 100 and external electronic components (not shown). The electrical connection portion 421 may be a connector or an edge connector (gold fingers). The plurality of electronic components 80 and the electrical connection portion 421 may be located on two different surfaces of the printed circuit board 40 or on a same surface of the printed circuit board 40. In at least one embodiment, the plurality of electronic components 80 and the electrical connection portion 421 are located on a same surface of the printed circuit board 40.

The optical filter 50 prevents stray light from entering into the lens module 100 and, only allows light with a specific wavelength to pass through, so as to reduce the influence of stray light on image quality. The optical filter 50 is received and fixed in the second receiving groove 34.

In at least one embodiment, the optical filter 50 is fixed on the supporting portion 36 by a third adhesive layer 73. In at least one embodiment, the third adhesive layer 73 is a thermally conductive adhesive with good heat dissipation performance.

The sensor 60 is mounted and electrically connected to the printed circuit board 40. The sensor 60 includes a photosensitive area 61 and a non-photosensitive area 62. The non-photosensitive area 62 surrounds the photosensitive area 61. The photosensitive area 61 faces the through hole 35. The center of a circle of the arc surface 361 falls within the non-photosensitive area 62 of the sensor 60 to make reflecting light reflected by the arc surface 361 to fall outside the sensor 60.

The lens module 100 further includes a reinforcing glue 90. The reinforcing glue 90 is adhered to the bracket 30 and the printed circuit board 40 to enhance the strength and overall reliability of the lens module 100. In at least one embodiment, the reinforcing glue 90 is a thermally conductive glue with good heat dissipation performance to enhance the heat dissipation effect of the lens module 100.

Figure 4:
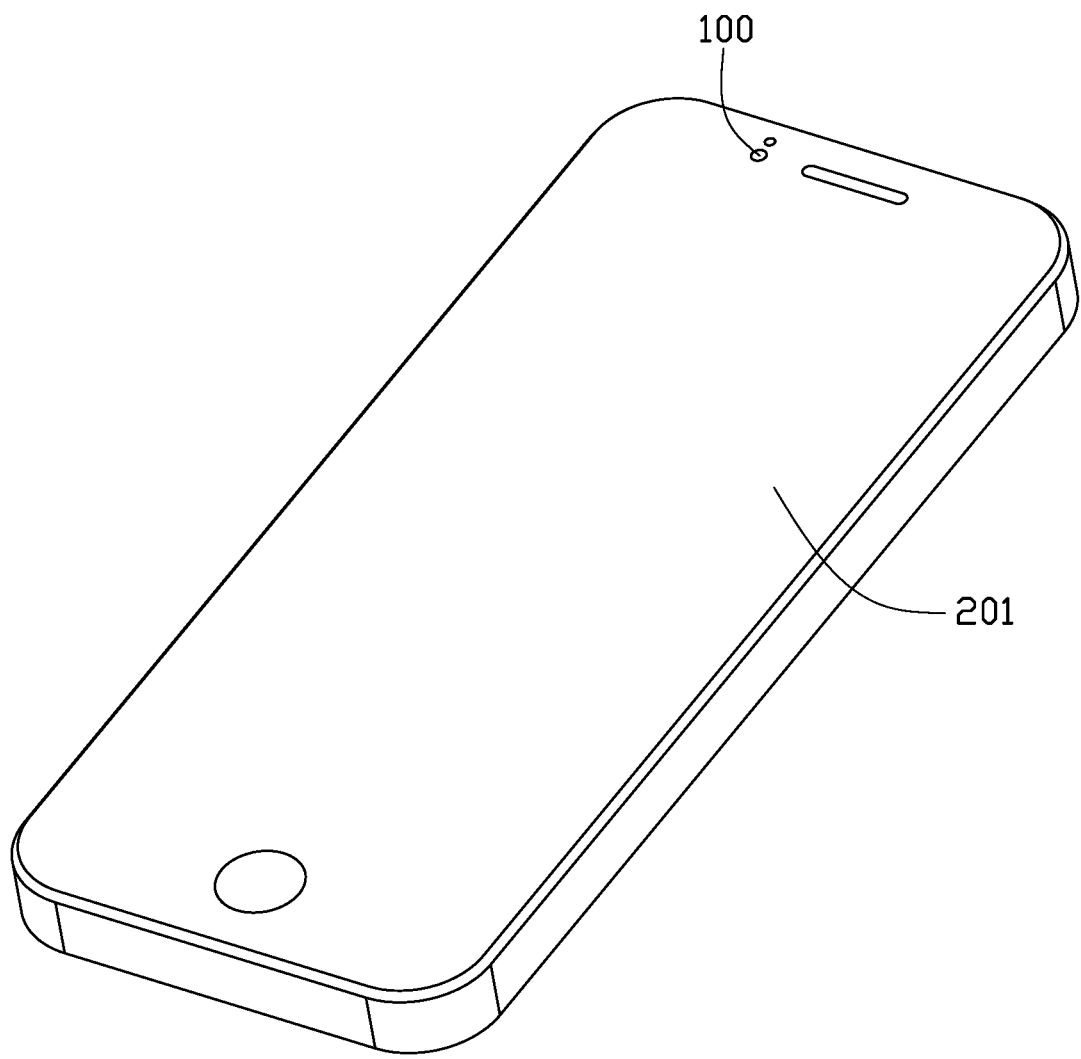
FIG. 4 is a perspective view of an electronic device.

FIG. 4 shows an embodiment of an electronic device 200. The electronic device 200 includes a body 201. The lens module 100 is mounted in the body 201. The electronic device 200 may be a smart phone, a tablet computer, or the like. In at least one embodiment, the electronic device 200 is a smart phone.

With the embodiments described above, the supporting portion 36 includes the arc surface 361, the center of a circle of the arc surface 361 falls within the non-photosensitive area 62 of the sensor 60, the light L1 entering the non-photosensitive area 62 is reflected to the arc surface 361 and then reflected by the arc surface 361 to form the reflecting light L2. The reflecting light L2 falls outside the sensor 60 to reduce flare and a risk of dark edges, thereby improving the image quality of the lens module 100.

The embodiments shown and described above are only examples. Many details are often found in the art such as the other features of a bracket, a lens module including the bracket, and an electronic device using the lens module. Therefore, many such details are neither shown nor described. Even though numerous characteristics and advantages of the present disclosure have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A bracket comprising:
   a supporting portion; the supporting portion comprising an arc surface; and
   a first receiving groove;
   a second receiving groove, wherein the supporting portion is formed at a junction between the first receiving groove and the second receiving groove; a sensor is received in the first receiving groove, the sensor comprises a photosensitive area and a non-photosensitive area surrounding the photosensitive area, the arc surface faces the sensor, a center of a circle of the arc surface falls within the non-photosensitive area, causing light entering the non-photosensitive area to be reflected by the arc surface and then to fall outside the sensor.

2. The bracket of claim 1, wherein a through hole is defined in a middle of the supporting portion, the first receiving groove is connected to the second receiving groove by the through hole, and the through hole faces the photosensitive area.

3. A lens module comprising:
   a bracket; wherein the bracket comprises a supporting portion, a first receiving groove, and a second receiving groove; wherein the supporting portion is formed at a junction between the first receiving groove and the second receiving groove, and the supporting portion comprises an arc surface; and
   a sensor; wherein the sensor is received in the first receiving groove, the sensor comprises a photosensitive area and a non-photosensitive area surrounding the photosensitive area, the arc surface faces the sensor, a center of a circle of the arc surface falls within the non-photosensitive area, causing light entering the non-photosensitive area to be reflected by the arc surface and to fall outside the sensor.

4. The lens module of claim 3, wherein the supporting portion is formed at a junction between the first receiving groove and the second receiving groove, a through hole is defined in a middle of the supporting portion, the first receiving groove is connected to the second receiving groove by the through hole, and the through hole faces the photosensitive area.

5. The lens module of claim 4, further comprising an optical filter received in the second receiving groove and formed on the supporting portion; and wherein the optical filter faces the through hole.

6. The lens module of claim 5, further comprising a lens formed above the bracket, and wherein the optical filter faces the lens.

7. The lens module of claim 6, further comprising a printed circuit board, wherein the sensor is mounted and electrically connected to the printed circuit board.

8. The lens module of claim 7, further comprising a voice coil motor, wherein the voice coil motor is mounted in the bracket and electrically connected to the printed circuit board.

9. The lens module of claim 8, wherein the voice coil motor comprises a lens receiving groove, the lens is received in the lens receiving groove, a plurality of internal threads is defined on an internal wall of the lens receiving groove, a plurality of external threads is defined on an external wall of the lens, and the plurality of internal threads matches with the plurality of external threads.

10. An electronic device, comprising:
a body; and
a lens module mounted in the body comprising:
a bracket; wherein the bracket comprises a supporting portion, a first receiving groove, and a second receiving groove; wherein the supporting portion is formed at a junction between the first receiving groove and the second receiving groove; and the supporting portion comprises an arc surface; and
a sensor; wherein the sensor is received in the first receiving groove, the sensor comprises a photosensitive area and a non-photosensitive area surrounding the photosensitive area, the arc surface faces the sensor, a center of a circle of the arc surface falls within the non-photosensitive area, causing light entering the non-photosensitive area to be reflected by the arc surface and to fall outside the sensor.

11. The electronic device of claim 10, wherein the supporting portion is formed at a junction between the first receiving groove and the second receiving groove, a through hole is defined in a middle of the supporting portion, the first receiving groove is connected to the second receiving groove by the through hole, and the through hole faces the photosensitive area.

12. The electronic device of claim 11, further comprising an optical filter received in the second receiving groove and formed on the supporting portion; wherein the optical filter faces the through hole.

13. The electronic device of claim 12, further comprising a lens formed above the bracket, wherein the optical filter faces the lens.

14. The electronic device of claim 13, further comprising a printed circuit board, wherein the sensor is mounted and electrically connected to the printed circuit board.

15. The electronic device of claim 14, further comprising a voice coil motor, wherein the voice coil motor is mounted in the bracket and electrically connected to the printed circuit board.

16. The electronic device of claim 15, wherein the voice coil motor comprises a lens receiving groove, the lens is received in the lens receiving groove, a plurality of internal threads is defined on an internal wall of the lens receiving groove, a plurality of external threads is defined on an external wall of the lens, and the plurality of internal threads matches with the plurality of external threads.

\* \* \* \* \*